(12) United States Patent
Kim et al.

(10) Patent No.: US 8,187,496 B2
(45) Date of Patent: May 29, 2012

(54) METHOD OF PREPARING METALLIC OXIDE PHOSPHOR

(75) Inventors: Hyun-Sik Kim, Yongin-si (KR); Soon-Jae Kwon, Yongin-si (KR); Soo-Yeon Seo, Yongin-si (KR)

(73) Assignee: Samsung Mobile Display Co., Ltd., Nongseo-Dong, Giheung-Gu, Yongin, Gyunggi-Do (KR)

( * ) Notice: Subject to any disclaimer, the term of this patent is extended or adjusted under 35 U.S.C. 154(b) by 503 days.

(21) Appl. No.: 12/385,583

(22) Filed: Apr. 13, 2009

(65) Prior Publication Data

US 2010/0012899 A1  Jan. 21, 2010

(30) Foreign Application Priority Data

Jul. 17, 2008  (KR) .................. 10-2008-0069747

(51) Int. Cl.
*C09K 11/00* (2006.01)

(52) U.S. Cl. .... 252/301.4 R; 252/301.4 P; 252/301.4 F; 252/301.4 H; 252/301.5; 252/301.6 R; 252/301.6 F

(58) Field of Classification Search ........... 252/301.4 R, 252/301.4 P, 301.4 F, 301.4 H, 301.5, 301.6 R, 252/301.6 F, 301.6 P See application file for complete search history.

(56) References Cited

U.S. PATENT DOCUMENTS 5,413,736 A * 5/1995 Nishisu et al. ......... 252/301.4 R

OTHER PUBLICATIONS

Li et al, "Solvothermal synthesis and luminescnet propeties of YASG:Yb nano-sized phosphors", Journal Phys and Chem of solids, 66, 2001-2005, 2005.*

* cited by examiner

*Primary Examiner* — Carol M Koslow
(74) *Attorney, Agent, or Firm* — Robert E. Bushnell, Esq.

(57) ABSTRACT

A method for preparing a metal oxide phosphor contemplates preparing a solution including a metal precursor compound and an ionic material and heating the solution under pressure using microwaves.

17 Claims, 8 Drawing Sheets

WATER          ALCOHOL          IONIC MATERIAL

METHOD OF PREPARING METALLIC OXIDE PHOSPHOR

CLAIM OF PRIORITY

This application makes reference to, incorporates the same herein, and claims all benefits accruing under 35 U.S.C. §119 from an application earlier filed in the Korean Intellectual Property Office on Jul. 17, 2008 and there duly assigned Serial No. 10-2008-0069747.

BACKGROUND OF THE INVENTION

1. Field of the Invention

The present invention relates to a method for preparing a metallic oxide phosphor, and more particularly, a method for preparing a metallic oxide phosphor, by which nano-sized particles with uniform particle size distribution and improved crystallinity can be obtained.

2. Description of the Related Art

A phosphor is a material exhibiting luminescence characteristics when excited by energy. In general, the phosphor is used in a light source such as a mercury fluorescent lamp and a mercury-free fluorescent lamp, and in various devices such as an electron emission device and a plasma display panel (PDP). Also, along with the development of new multimedia devices, phosphors are expected to be used in wide variety of applications in the future.

Nano phosphors, also referred to as nano-sized phosphors, advantageously exhibit a low light scattering effect and a large specific surface area compared to the contemporary bulk-sized phosphors, thereby improving light emitting properties.

Requirements for nano phosphors include small particle size, non-aggregated particles, and excellent luminescence efficiency. Phosphors made of small and non-aggregated particles usually exhibit a considerable reduction in the luminescence efficiency. To compensate for the reduction in the emission efficiency, one among contemporary attempts has been made to raise heating temperature or heating time, which may, however, result in agglomeration of phosphor particles. That is, the size of the resulting phosphor may exceed nano size regime. Another disadvantage with the contemporary methods for making nano phosphors is a prolonged processing time, which includes mixing, drying, firing, pulverizing, and the like. To overcome the contemporary preparation methods of nano phosphors, various alternative methods, such as, spray pyrolysis methods, and laser crystallization, have been used. These methods generally require, however, high facility costs and operation costs and face difficulties in mass production.

SUMMARY OF THE INVENTION

It is an object of the present invention to provide an improved method and apparatus for preparing a metal oxide phosphor.

It is another object of the present invention to provide a method and apparatus for preparing a metallic oxide phosphor having nano-sized particles with uniform particle size distribution and excellent crystallinity.

It is still another object of the present invention to provide a metallic oxide phosphor prepared according to the method.

According to an aspect of the present invention, a method for preparing a metallic oxide phosphor may be provided by:
(a) preparing a solution including a metallic precursor compound and an ionic material; and (b) heating the solution under pressure using microwaves.

A dipole moment of the ionic material may be in the range of approximately 5 debye to 80 debye.

The ionic material may include at least one ion selected from the asymmetric organic ions group consisting of alkylpyridinium (trifluoromethane sulfonyl)imide ($[N(SO_2CF_3)_2]^-$), (1-alkyl-3-methylimidazolium)$^+$, and alkylsulfonate, or one selected from asymmetric organic ions with its counter anion ($Cl^-$, $Br^-$, $I^-$, $PF_6^-$, $BF_4^-$, $AlCl_4^-$) or counter cation ($Me_4N^+$, $BuMe_3N^+$).

A molar ratio of the metallic precursor compound to the ionic material may be in the range of approximately 100:1 to approximately 1:10 in the solution including the metal precursor compound and the ionic material.

The solution may further include a surfactant.

A frequency of the microwave may be in the range of approximately 300 MHz to approximately 300 GHz.

The heating may be conducted for approximately 5 minutes to approximately 60 minutes using microwaves.

According to another aspect of the present invention, there is provided a metal oxide phosphor, which is prepared according the above method, used for plasma display panels (PDPs), inorganic electroluminescence devices, and UV-excitation display devices.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
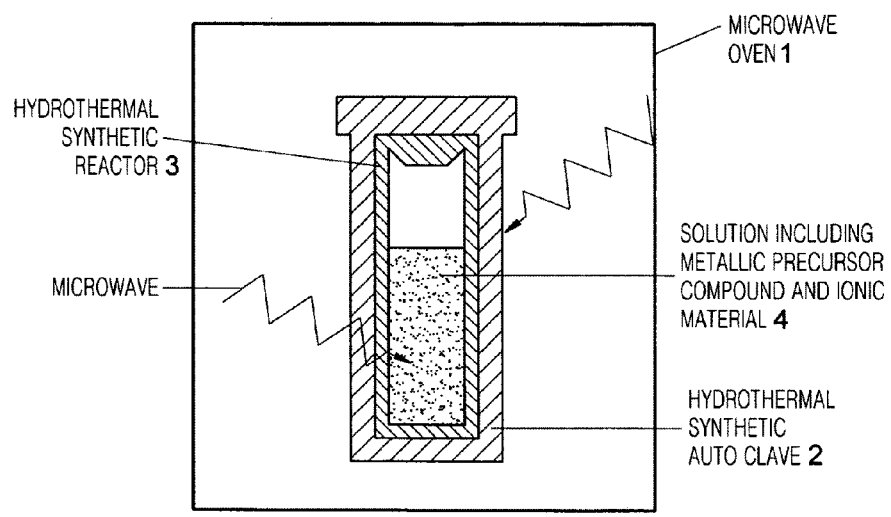
FIG. 1 schematically illustrates a cross section of a microwave oven used to synthesize a phosphor according to a method for preparing a metallic oxide phosphor according to an embodiment of the principles of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

The present invention provides a method for preparing a metal oxide phosphor. The method includes the steps of:

(a) preparing a solution comprising of a metal precursor compound and an ionic material; and (b) heating the solution under pressure using microwaves.

Since overall synthesis time can be shortened and growth and agglomeration of metal oxide phosphor particles can be controlled, the shape and size of the metal oxide phosphor particles may be controlled and the crystallinity of the metal oxide phosphor particles may be improved according to the method for preparing the metal oxide phosphor according to the principles of the present invention, compared to a contemporary method for preparing a phosphor using a hydrothermal synthesis.

The method for preparing the metallic oxide phosphor according to an embodiment of the present invention will be described in more detail.

First, a metallic precursor compound, used to form a phosphor, is dissolved in a solvent directly or using an acid or base to prepare a solution.

The metal precursor compound may be a carbonate, a nitrate, a chloride, a hydroxide, an oxalate, an acetate, or alkoxide of one of Mg, Ca, Sr, Ba, Zn, Mn, Al, Ga, B, Y, La, Ce, Gd, Eu, Pr, Dy, Tm, Tb, Er, Yb, Sm, Bi, Sb, Ge, Si, and Sn; tetraethyl orthosilicate (TEOS); tetramethyl orthosilicate (TMOS); $H_3BO_3$; $NH_4B_5O_8$; $H_3PO_4$; $NH_4H_2PO_4$; $(NH_4)_2HPO_4$; $NH_4H_2PO_4$; $(NH_4)_3PO_4$; $VO(SO_4)$; $Na_3VO_4$; $NaVO_3$; $NH_4VO_3$; and $Na_2(NH_4)_4V_{10}O_{28}$, or compounds of at least two materials selected from those listed above.

A molar ratio of the finally obtained oxide nano phosphor may be easily adjusted by adjusting an amount of the metal precursor compound.

The preparation method according to the principles of the present invention may be applied to synthesis of various oxide phosphors, for example, $(Gd,Y,Sc,Lu,La)BO_3:Eu^{3+}$, $(Gd,Y,Sc,Lu,La)_2O_3:Eu^{3+}$, $(Gd,Y,Sc,Lu,La)(P,V)O_4:Eu^{3+}$, $(Ca,Sr,Ba)_2P_2O_7:Eu^{2+},Mn^{2+}$, $(Ca,Sr,Ba)_5(PO_4)_3(Cl,F,Br,OH):Eu^{2+},Mn^{2+}$, $ZnSiO_3:Mn^{2+}$, $(Ca,Sr,Ba)MgAl_{10}O_{17}:Eu^{2+},Mn^{2+}$, $(Ca,Sr,Ba)Al_2O_4:Eu^{2+}$, $(Ca,Sr,Ba)BPO_5:Eu^{2+},Mn^{2+}$, $Y_3Al_5O_{12}:Ce^{3+}$, $(Ca,Sr,Ba)_2SiO_4:Eu^{2+}$, and $(Ca,Sr,Ba)_3SiO_5:Eu^{2+}$. A metal precursor compound of the phosphor may be $YCl_3$, $VO(SO_4)$, $H_3PO_4$, $EuCl_3$, $Na_3VO_4$, $H_3BO_3$, $Al(NO_3)_3$, $Sr(NO_3)_2$, $Ca(NO_3)_2$, $Ba(NO_3)_2$, $MgCl_2$, $CeCl_3$, $TbCl_3$, tetraethyl orthosilicate (TEOS), or the like. In the above formulas and the corresponding formulas in the claims, the multiple elements in the parenthesis indicate that at least one of the multiple elements is presented.

An ionic material is added to the solution including the metal precursor compound prepared as described above to prepare a solution including the metal precursor compound and the ionic material of operation step (a). The order of adding the metal precursor compound and the ionic material is however, not limited.

The ionic material may be a material including only ions, particularly a liquid-state material having a high electric dipole moment. The ionic material improves a microwave absorbing capability. When a microwave irradiates a material, the material absorbs energy of the microwave. Formula 1 below exhibits a theoretical degree of the absorbed energy in a unit volume of the material per hour. The microwave is an electromagnetic wave having a equency in the range of 300 MHz to 300 GHz.

$$P=2\pi f \epsilon'' E^2 = \sigma E^2 \quad (1)$$

Here, P is the absorbed energy (power/volume), f is a frequency of the microwave, $\epsilon''$ is a complex permittivity, $\sigma$ is a conductivity the material absorbing the energy of the microwave, and E is an electric field intensity.

Figure 3:
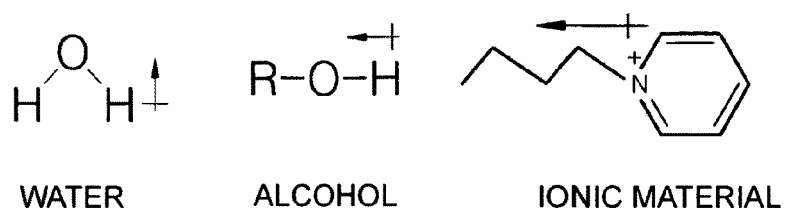
FIG. 3 schematically illustrates electric dipole moments of a water molecule, an alcohol molecule, and an ionic material, using arrows to indicate direction and magnitude of the electric dipole moments.

In this regard, if a material has an electric dipole moment, i.e., polarity, electron cloud is concentrated in a portion of a molecule formed of more than two atoms. The electric dipole moment remains relatively constant and sometimes exhibits an exposed degree of atomic nucleus. In particular, if a molecule is formed of more than two atoms and electrons are concentrated around one atomic nucleus (for example, oxygen of $H_2O$), the portion having a high electron density is indicated as $\delta^-$, and the other portion is indicated as $\delta^+$. FIG. 3 schematically illustrates electric dipole moments of a water molecule, an alcohol molecule, and an ionic material using arrows to indicate the direction and magnitude of the electric dipole moments. The arrows around each of the molecules are oriented from the $\delta^+$ to the $\delta^-$, and the strength of the polarity caused by the $\delta^+$ and $\delta^-$ is shown as the length of the arrows. As shown in FIG. 3, the electric dipole moment of the ionic material is larger than that of the water molecule or alcohol molecule as is indicated by the greater amplitude of the vector arrow representing the electric dipole moment. In particular, the ionic material used herein has high $\epsilon''$ and $\sigma$ values, and thus P value may be increased, which indicates that the amount of the absorbed microwave energy is increased. Thus, if a microwave irradiates the solution including the metallic precursor compound and the ionic material prepared according to the principles of the present invention, the amount of the absorbed energy is increased.

The ionic material used herein has an electric dipole moment higher than that of the water molecule or the alcohol molecule. More particularly, the electric dipole moment of the ionic material may be in a range of approximately 5 debye to approximately 80 debye (1 debye=$1\times10^{-18}$ statcoulomb centimeter). If the electric dipole moment of the ionic material is less than 5 debye, the degree of the microwave absorption may not be satisfactory.

The ionic material may include at least one ion selected from the asymmetric organic ions group consisting of alkylpyridinium, (trifluoromethane sulfonyl)imide($[N(SO_2CF_3)_2]^-$), (1-alkyl-3-methylimidazolium)$^+$, and alkylsulfonate, or one selected from asymmetric organic ions with its counter anion ($Cl^-$, $Br^-$, $I^-$, $PF_6^-$, $BF_4^-$, $AlCl_4^-$) or counter cation ($Me_4N^+$, $BuMe_3N^+$).

A molar ratio of the metal precursor compound to the ionic material may be in the range of approximately 100:1 to approximately 1:10 in the solution including the metal precursor compound and the ionic material. If the molar ratio of the metal precursor compound to the ionic material is greater than 100:1, the microwave energy absorbing capability of the ionic material may be decreased. On the other hand, if the molar ratio of the metallic precursor compound to the ionic material is less than 1:10, the reaction may either abruptly occur or explosively occur.

The solution including the metallic precursor compound and the ionic material may further include a surfactant. The surfactant may be at least one selected from the group consisting of citric acid, acetic acid ($CH_3COOH$), sodium acetate ($NaCOOCH_3$), ammonium acetate ($NH_4COOCH_3$), oleic acid, sodium oleate ($C_{17}H_{33}COONa$), ammonium oleate ($C_{17}H_{33}COONH_4$), ammonium succinate ($NH_4COOCH_2CH_2COONH_4$), polyacrylate, glycine, l acylglutamate, and sodium dodecylbenzenesulfonate. The particle size of finally obtained nano phosphor may be more easily controlled by using the surfactant.

Materials that convert absorbed energy to visible light without going to high temperatures i.e. incandescence are known as luminescent materials and also referred as 15 phosphors. Such materials find applications in displays like television i.e. cathode ray tubes (CRT), plasma display panels (PDP), Electroluminescence (EL) based displays and field emission displays; in light sources like fluorescent tubes, compact fluorescent lamps and cold cathode lamps; as detectors for x-rays, temperature and pressure. Phosphors are generally in crystalline powder form with size ranging from 1-100 μm. Phosphors with a dimension of less than 1 μm are called nano phosphors, and possess strikingly different absorption and emission characteristics with improved efficiency and life times 1 compared to the phosphors having a dimension within a range of between 1 μm to 100 μm. As band gap energy is varied with particle size in nanometer range, immense possibilities of designing phosphors and related devices are predicted. Synthesis of nano phosphors has been attempted by several methods and their properties have been compared to bulk phosphors by many workers 2. Work on devices and applications is going on but much of it is in regime of industrial secrecy. Nanophosphors synthesized with a view to different new applications employing cathodoluminescence are reported. Nanosized luminescent phosphors synthesized inside the voids and different templates have been employed for different situations with increased resolution. This class of materials processed with inorganic cappings such as ZnO capped ZnS:Mn, ZnS capped CdS have not only increased efficiency but also much better operational resistance in devices.

The solvent of the solution for the metal precursor solution may be at least one selected from the group consisting of water, methanol, ethanol, ethylene glycol, diethylene glycol, glycerol, and 1,4-butylene glycol.

As described above, the microwave irradiates the solution including the metal precursor compound and the ionic material to synthesize the metal oxide phosphor.

FIG. 1 schematically illustrates a cross section of a microwave oven used to synthesize a phosphor according to a method for preparing a metallic oxide phosphor according to an embodiment of the principles of the present invention.

As illustrated in FIG. 1, microwave oven 1 includes a hydrothermal synthetic autoclave 2 and a hydrothermal synthetic reactor 3 disposed inside hydrothermal synthetic autoclave 2. Hydrothermal synthetic reactor 3 contains solution 4 including the metallic precursor compound and the ionic material described previously. An autoclave is a pressurized device designed to heat aqueous solutions above their boiling point at normal atmospheric pressure. Therefore, in the embodiment according to the principles of the present invention, solution 4 is irradiated using the microwave under elevated temperature and pressure.

Microwave oven 1 illustrated in FIG. 1 is distinguished from a contemporary microwave oven or furnace that is commonly used to prepare a phosphor. Phosphor synthesis takes a long time in the contemporary microwave oven or furnace because the thermal energy transferred to a container heats a solvent, and then the energy of the heated solvent induces reactions between the reactants. That is, a material such as silicon carbide (SiC) is heated using microwave irradiation, and then convention heat generated by the silicon carbide (SiC) induces the reactions.

Meanwhile, in the microwave oven according to the principles of the present invention as shown in FIG. 1, the microwave directly irradiates the solution.

Microwave oven 1 of the present invention as illustrated in FIG. 1 is distinguished from a contemporary microwave oven or furnace that is commonly used to prepare a phosphor, because the microwave oven according to the present invention is constructed with an autoclave which is a pressurized device. Therefore, the solution can be heated under pressure using the autoclave in the microwave oven of the present invention. On the other hand, the contemporary microwave oven does not include an autoclave, so that the solution can not be heated under pressure. According to the present invention, the solution including the metal precursor compound and the ionic material is rapidly heated since the direct microwave is used as an energy source for heating the solution, that is, the irradiating microwaves interact with the solution/reactants; that is, the microwaves directly work on the metal precursor compound. Such dynamics of the microwave may further shorten the reaction time. In addition, if nucleation occurs in the solution including the metal precursor compound and the ionic material, the ionic material surrounds the naturally formed nucleus due to the electric dipole moment of the ionic material. The peripheral regions of the nucleus surrounded by the ionic material absorb more energy, thereby generating a local super heating effect. Accordingly, a large number of nucleation events are observed, and also uniform nucleation events are observed.

As described above, according to the method of the present invention, a spatial temperature gradient in the solution may be minimized, nucleation density and particle growth rate become uniform, and thus nano particles having uniform particle size and uniform shape (particularly, spherical shape) may be synthesized due to the rapid heating and local super heating effect.

Furthermore, reaction time may be shortened due to quick and effective heat transfer and microwave irradiation may be instantly controlled by power on/off, compared to a contemporary heating method which takes a long time to heat and cool the solution.

Figure 2:
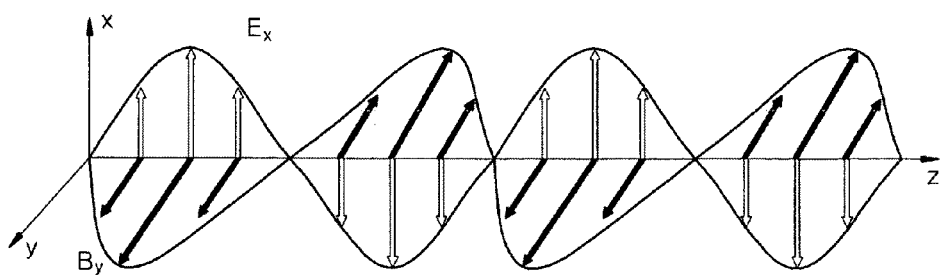
FIG. 2 schematically illustrates a microwave propagating in the Z-axis direction.

As shown in FIG. 2, a microwave propagating in the Z-axis direction has an electric field which vibrates in X-Z plane and a magnetic field which vibrates in Y-Z plane. In this regard, the electric field lines intersect the magnetic field lines at right angles to vibrate and propagate.

When a solution is disposed inside a contemporary microwave oven, water, fat, and other substances in the solution absorb energy from the microwaves in a process called dielectric heating. Many molecules, such as water molecules, alcohol molecules, and ionic materials, have electric dipoles; in other words, the molecules have a positive charge at one end and a negative charge at the other end. Therefore, when a solution containing the molecules having electric dipoles is disposed inside a contemporary microwave oven, the molecules rotate as they try to align themselves with the alternating electric field of the microwaves as shown in FIG. 3. In other words, each of the arrow vectors individually shown in FIG. 3 in respective association with the water, alcohol and ionic material molecules are aligned in parallel, with the lines of the electric field represented by the electric filed vectors shown during propagation in the "z" direction, by FIG. 3. For all of these molecules their respective electron clouds surround the corresponding molecule. The positions and shapes of the electron clouds are determined by Schrodinger's equation.

The molecular movement creates heat as the rotating molecules hit other molecules in the solution, thus putting the other molecules into motion.

When the microwave meets a molecule having electric dipole moment shown in FIG. 3 (water molecule, alcohol molecule, and ionic material), microwave energy transferred to the molecule may be measured using Formula 1 above.

The frequency of the microwave may be in the range of 300 MHz to 300 GHz.

The solution including the metal precursor compound and the ionic material may be heated using the microwave for approximately 5 minutes to 60 minutes, preferably for approximately 10 minutes to 20 minutes. While the reaction takes for a long time of 10-20 hours when the phosphor is synthesized by using the contemporary hydrothermal synthesis method, the phosphor synthesis may be performed for a short time of several minutes to several tens of minutes by using the method according to the present invention. Since the ionic material used herein has a high electric dipole moment, the microwave absorbing capability may be improved by increasing chemical polarity of a solvent used to a hydrothermal synthesis or solvothermal synthesis using microwaves. By using the ionic material, nano particles synthesized using the method of the present invention may have high crystallinity.

According to the method for preparing the metallic oxide phosphor according to the present invention, the solution including the metal precursor compound and the ionic material may be heated using microwaves at approximately 150° C. to approximately 300° C.

The heating may be conducted at approximately 20 PSI (pound per square inch) to approximately 800 PSI using microwaves in step (b).

The method of the present invention may further include heat-treating the resultant of step (b). Using the post heat treatment may further improve crystallinity. The heat-treatment may be performed at approximately 500° C. to approximately 1500° C.

As described above, according to the method of the present invention, the shape and size of the phosphor may be easily controlled and particles having high crystallinity may be synthesized in a short reaction time. In addition, a large number of nuclei may be uniformly synthesized due to rapid and uniform heating by irradiating the microwave, and nano particles having uniform particle size may be synthesized since crystals uniformly grow. Accordingly, nano-sized phosphors having uniform particle distribution and uniform particle size may be prepared.

According to the method of the present invention, a metallic oxide phosphor having a particle size of approximately 20-1000 nm, preferably 200-500 nm, may be prepared.

Most of the metallic oxide particles prepared according to the method for preparing a metallic oxide phosphor according to the present invention have spherical shapes. It is well known that the shape of the phosphor particle has a significant effect on the performance of flat panel displays including phosphors. Images may have an excellent brightness and a high resolution using the phosphor particles having spherical shapes, since the phosphor particles having spherical shapes can reduce scattering of generated visible rays and have high packing density, compared to phosphors having non-uniform shapes prepared according to a solid state reaction. The vacuum UV has a low penetration depth (100-200 nm depth) on the surface of the phosphor particles, and thus an area and properties of the surface have a significant effect on the light emitting efficiency. Thus, contemporarily, an additional milling or pulverizing process was required in order to obtain a desired shape of the phosphor. On the other hand, since a nano phosphor having uniform particle distribution and spherical shape can be prepared without using an additional milling or pulverizing process according to the method for preparing a metal oxide phosphor of the present invention, the nano phosphor prepared according to the method of the present invention can allow a PDP using the vacuum UV as an excitation source to have high efficiency and high definition.

As described above, the metal oxide nano phosphor having uniform particle distribution and spherical particle shape prepared according to the method for preparing the metal oxide phosphor of the present invention can be applied to an (ultra) high resolution PDP, or the like. In addition, since the size and shape of the phosphor can be controlled according to the method for preparing the metal oxide phosphor of the present invention, the method can be applied to a preparation of UV-excitation phosphor nano particles for UV-LED to improve characteristics of the phosphor and light emitting devices. Furthermore, the metallic oxide nano phosphor can also be applied to an inorganic electroluminescence device.

EXAMPLES

Example 1

A solution including 0.14 M $Y(NO_3)_3 \cdot 6H_2O$, 0.04M $Gd(NO_3)_3 \cdot 6H_2O$, 0.2 M $H_3BO_3$, and 0.02 M $Eu(NO_3)_3 \cdot 5H_2O$ was prepared. The solution was reacted in a microwave hydrothermal synthesis device at 260° C. for 20 minutes to synthesize a phosphor. 0.2 M butyl pyridinium ($[Py-C_4H_9]^+$) was added to the solution as an asymmetric organic ion absorbing the microwave.

Example 2

A solution including 0.14 M $Y(NO_3)_3 \cdot 6H_2O$, 0.04M $Gd(NO_3)_3 \cdot 6H_2O$, 0.2 M $H_3BO_3$, and 0.02 M $Eu(NO_3)_3 \cdot 5H_2O$ was prepared. The solution was reacted in a microwave hydrothermal synthesis device at 260° C. for 20 minutes to synthesize a phosphor. 0.2 M butyl pyridinium ($[Py-C_4H_9]^+$) was added to the solution as an asymmetric organic ion absorbing the microwave. Powder obtained by the hydrothermal synthesis was heat-treated at 900° C. for 1 hour.

Comparative Example 1

A solution including 0.14 M $Y(NO_3)_3 \cdot 6H_2O$, 0.04M $Gd(NO_3)_3 \cdot 6H_2O$, 0.2 M $H_3BO_3$, and 0.02 M $Eu(NO_3)_3 \cdot 5H_2O$ was prepared. The solution was reacted in a microwave hydrothermal synthesis device at 260° C. for 20 minutes to synthesize a phosphor. An asymmetric organic ion absorbing the microwave was not added to the solution.

Comparative Example 2

$Y_2O_3$, $Gd_2O_3$, $Eu_2O_3$, and $H_3BO_3$ were uniformly mixed in a ratio of 7:2:1:20 (Y:Gd:Eu=7:2:1) and heated while performing a solid state reaction at 1100° C. for 5 hours in the air to synthesize $(Y,Gd)BO_3:Eu^{3+}$.

Figure 4:
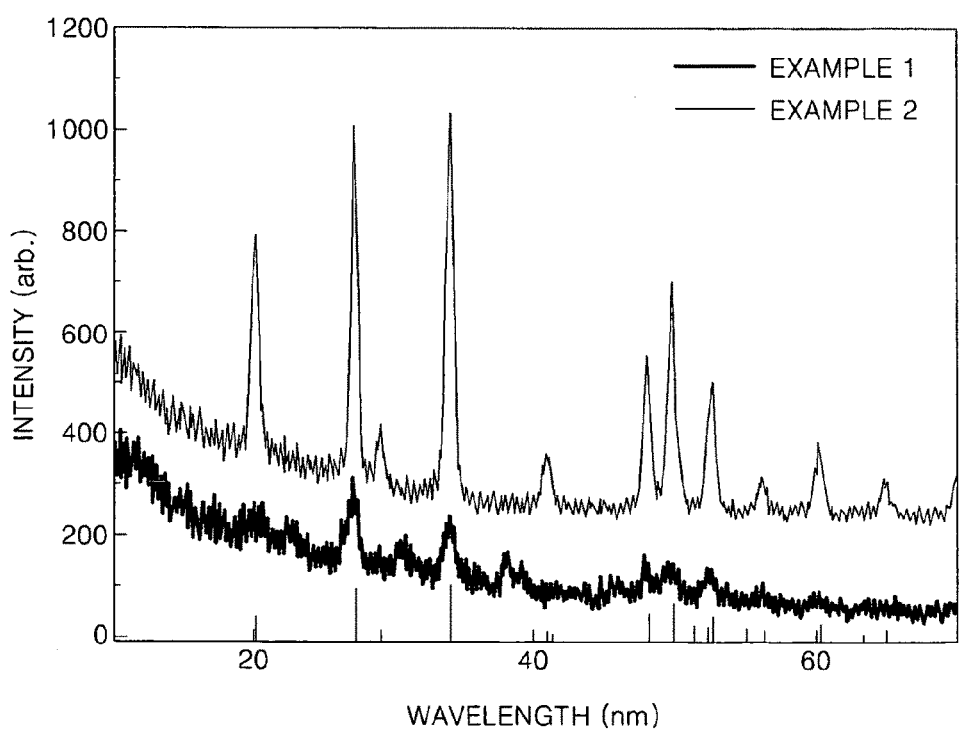
FIG. 4 is a graph illustrating X-ray diffraction (XRD) of metal oxide phosphors prepared in the practice of the principles of the present invention.

FIG. 4 is a graph illustrating X-ray diffraction (XRD) of nano particle powder synthesized according to Examples 1 and 2.

Figure 5A:
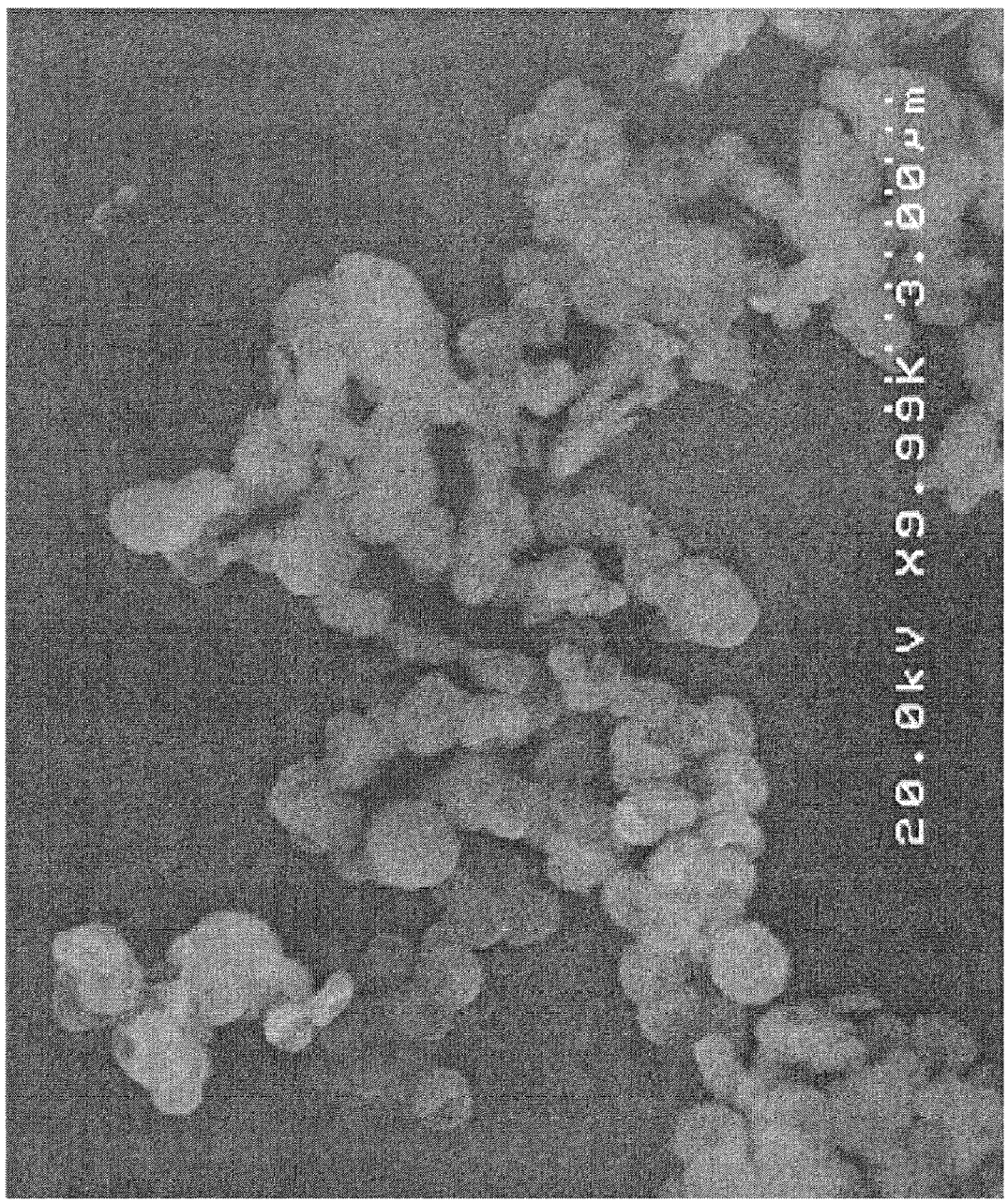
FIGS. 5A and 5B are scanning electron microscope (SEM) images of a metal oxide phosphor prepared according to an embodiment of the principles of the present invention and a phosphor prepared as a control group, respectively, acquired at 10,000× magnification.
Figure 5B:
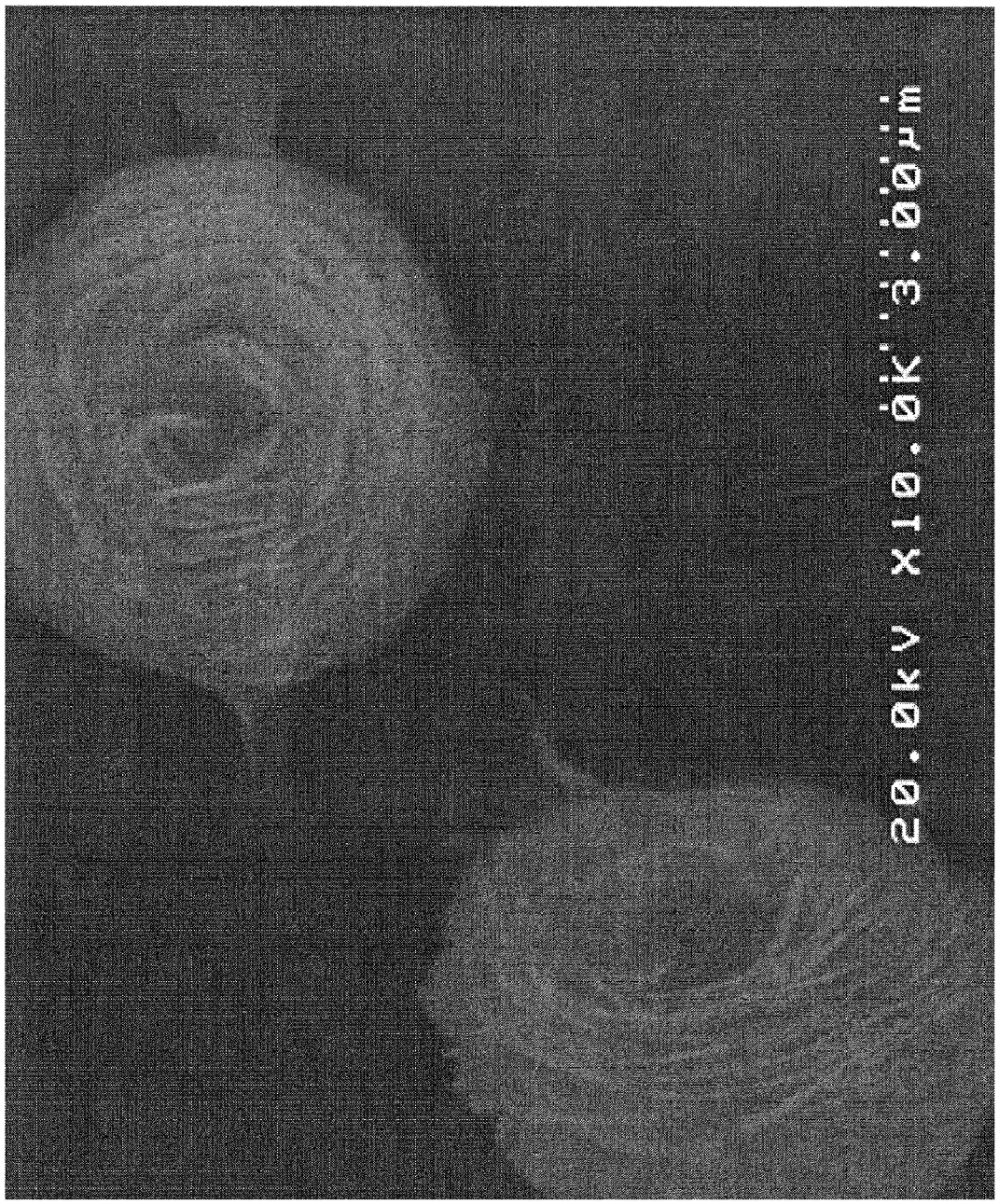

FIGS. 5A and 5B are scanning electron microscope (SEM) images of nano particle powder synthesized according to Example 2 and Comparative Examples 1, respectively, acquired at 10,000× magnifications.

Figure 6A:
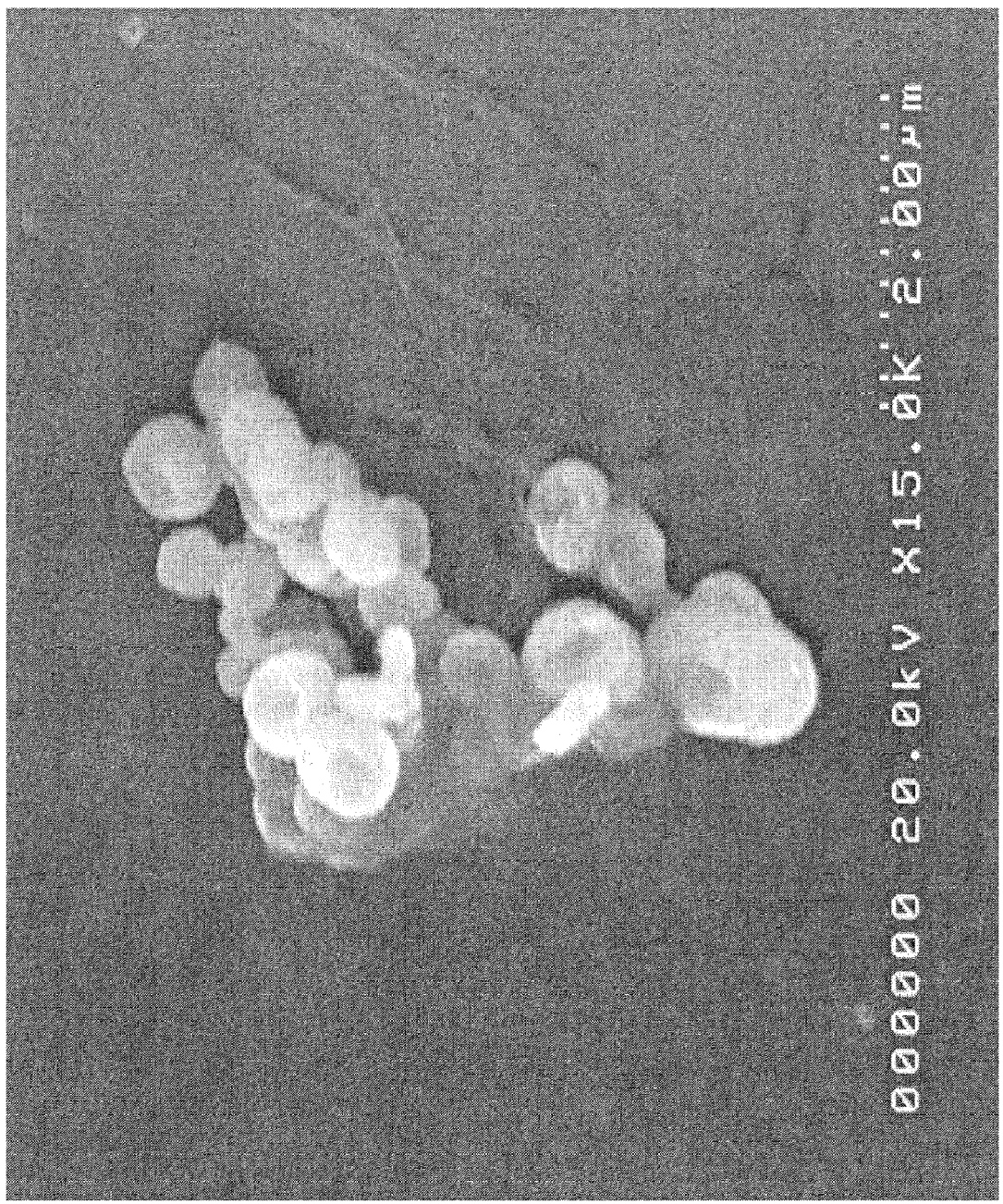
FIGS. 6A and 6B are scanning electron microscope (SEM) images of a metal oxide phosphor prepared according to an embodiment of the principles of the present invention and a phosphor prepared as a control group, respectively, acquired at 15,000× magnifications.
Figure 6B:
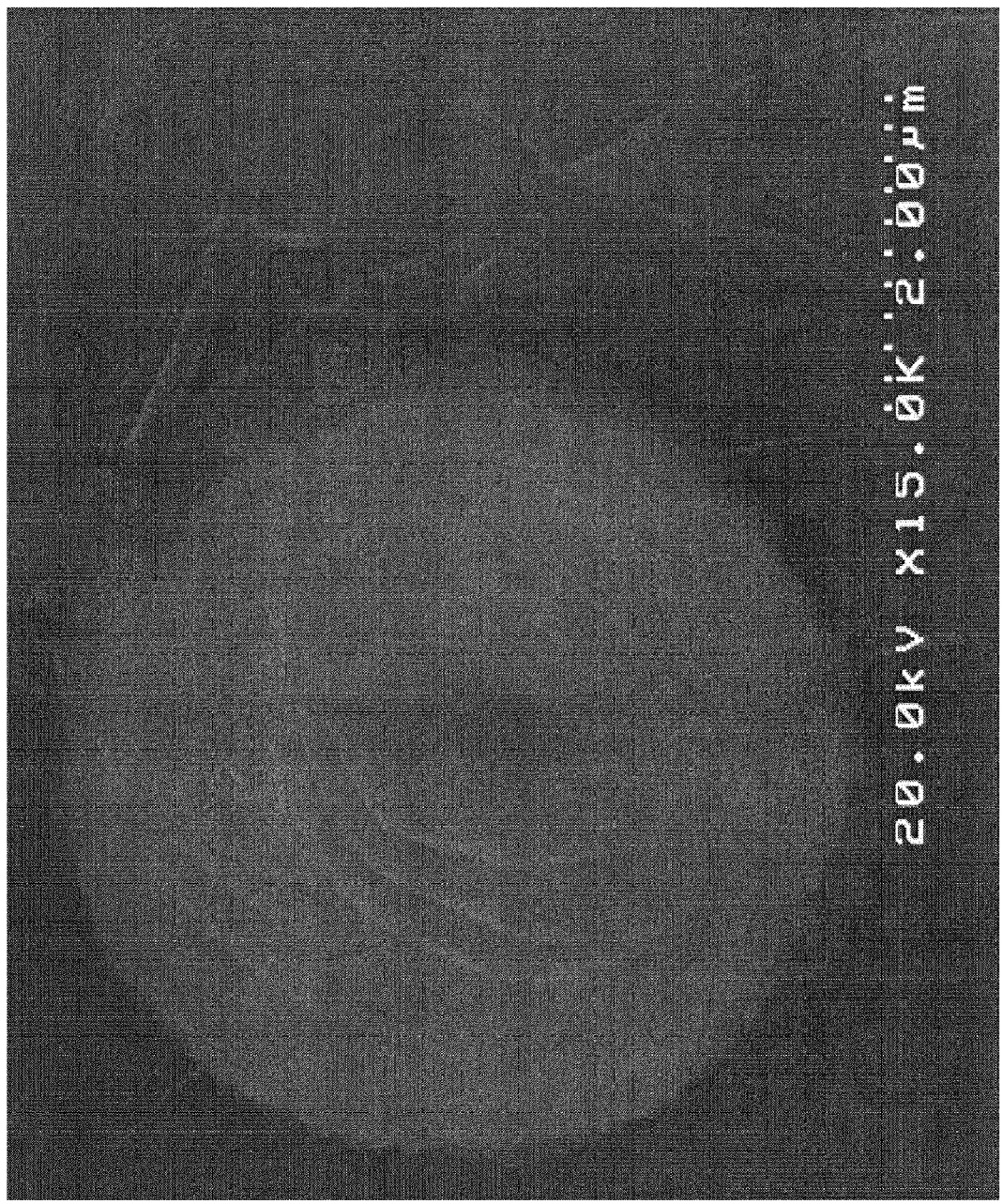

FIGS. 6A and 6B are scanning electron microscope (SEM) images of nano particle powder synthesized according to Example 2 and Comparative Examples 1, respectively, acquired at 15,000× magnifications.

Figure 7:
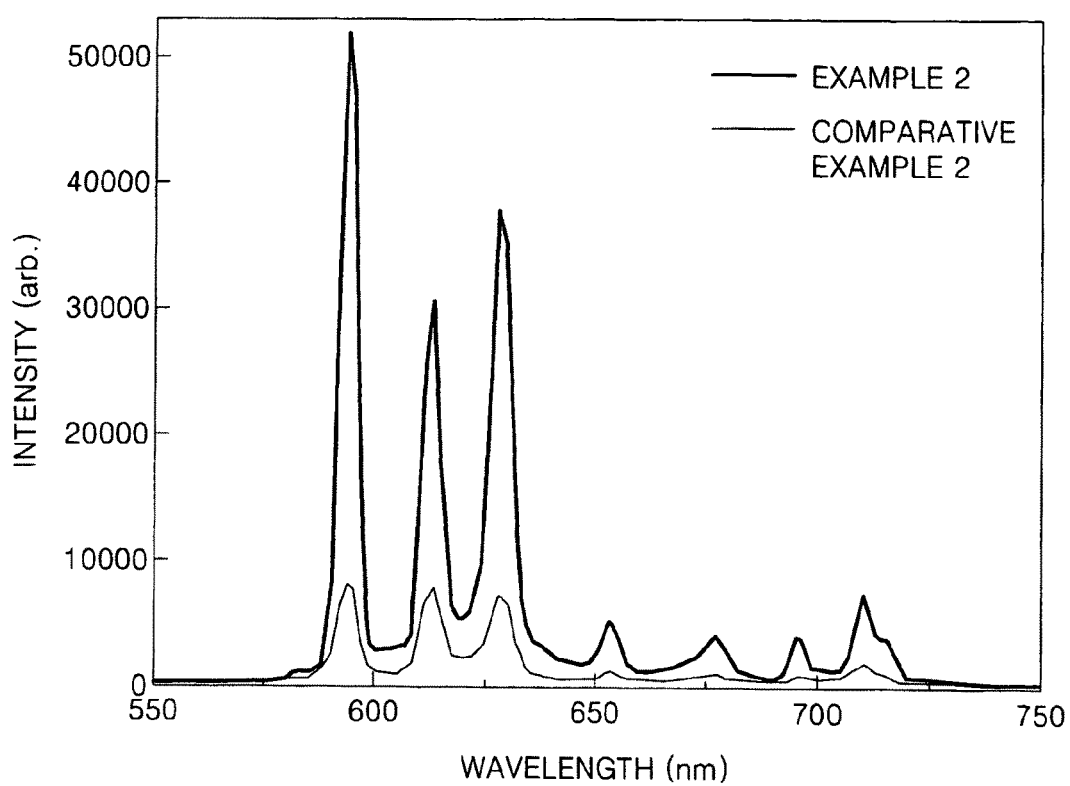
FIG. 7 is a graph illustrating emission photoluminescence (PL) of a metal oxide phosphor prepared according to an embodiment of the principles of the present invention measured at an excitation wavelength of 254 nm.

FIG. 7 is a graph illustrating emission photoluminescence (PL) of nano particle powders synthesized according to Example 2 and Comparative Example 2, respectively, and measured at an excitation wavelength of 254 nm.

Figure 8:
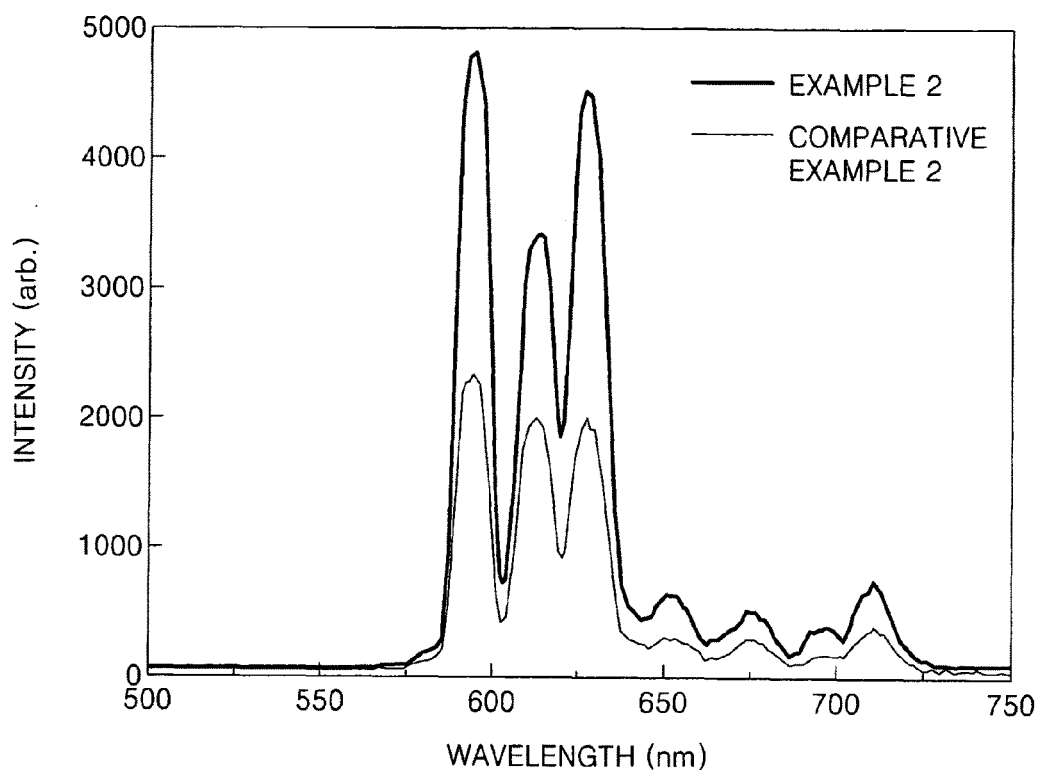
FIG. 8 is a graph illustrating emission photoluminescence (PL) of a metal oxide phosphor prepared according to an embodiment of the principles of the present invention measured at a vacuum UV excitation wavelength of 147 nm.

FIG. 8 is a graph illustrating emission photoluminescence (PL) of nano particle powders synthesized according to Example 2 and Comparative Example 2, respectively, and measured at a vacuum UV excitation wavelength of 147 nm.

According to the present invention, it can be seen that nano-sized particles having excellent crystallinity can be synthesized according to the method for preparing a metallic oxide phosphor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for preparing a metal oxide phosphor, the method comprising the steps of:
   (a) preparing a solution comprising a metal precursor compound and an ionic material; and
   (b) heating the solution under pressure using microwaves.

2. The method of claim 1, wherein the metal precursor compound is selected from among the group consisting of a carbonate, a nitrate, a chloride, a hydroxide, an oxalate, an acetate, or alkoxide of one of Mg, Ca, Sr, Ba, Zn, Mn, Al, Ga, B, Y, La, Ce, Gd, Eu, Ce, Pr, Dy, Tm, Tb, Er, Yb, Sm, Er, Bi, Sb, Ge, Si, and Sn; tetraethyl orthosilicate (TEOS); tetramethyl orthosilicate (TMOS); $H_3BO_3$; $NH_4B_5O_8$; $H_3PO_4$; $NH_4H_2PO_4$; $(NH_4)_2HPO_4$; $NH_4H_2PO_4$; $(NH_4)_3PO_4$; $VO(SO_4)$; $Na_3VO_4$; $NaVO_3$; $NH_4VO_3$; $Na_2(NH_4)_4V_{10}O_{28}$; and compounds of at least two materials selected from those listed above.

3. The method of claim 1, wherein a dipole moment of the ionic material is in a range of approximately 5 debye to approximately 80 debye.

4. The method of claim 1, wherein the ionic material comprises at least one ion selected from the group consisting of alkylpyridinium, (trifluoromethane sulfonyl)imide ($[N(SO_2CF_3)_2]^-$), (1-alkyl-3-methylimidazolium)$^+$, and alkylsulfonate and a counter anion or counter cation of the ion.

5. The method of claim 1, wherein a solvent of the solution comprises at least one selected from the group consisting of water, methanol, ethanol, ethylene glycol, diethylene glycol, glycerol, and 1,4-butylene glycol.

6. The method of claim 1, wherein a molar ratio of the metal precursor compound to the ionic material is in a range of approximately 100:1 to approximately 1:10 in the solution comprising the metal precursor compound and the ionic material.

7. The method of claim 1, wherein the solution further comprises a surfactant.

8. The method of claim 7, wherein the surfactant comprises at least one selected from the group consisting of citric acid, acetic acid ($CH_3COOH$), sodium acetate ($NaCOOCH_3$), ammonium acetate ($NH_4COOCH_3$), oleic acid, sodium oleate ($C_{17}H_{33}COONa$), ammonium oleate ($C_{17}H_{33}COONH_4$), ammonium succinate ($NH_4COOCH_2CH_2COONH_4$), polyacrylate, glycine, acylglutamate and sodium dodecylbenzenesulfonate.

9. The method of claim 1, wherein a frequency of the microwave is in a range of approximately 300 MHz to approximately 300 GHz.

10. The method of claim 1, wherein the heating is conducted for approximately 5 minutes to 60 minutes using microwaves in step (b).

11. The method of claim 1, wherein the heating is conducted at approximately 20 PSI to approximately 800 PSI using microwave in step (b).

12. The method of claim 1, comprised of the heating being conducted at approximately 150° C. to 300° C. using microwaves in step (b).

13. The method of claim 1, further comprising heat-treating the resultant of step (b).

14. The method of claim 13, wherein the heat-treatment is performed at approximately 500° C. to approximately 1500° C.

15. The method of claim 1, wherein the particle size of the metallic oxide is in the range of approximately 20 nm to approximately 1000 nm.

16. The method of claim 1, wherein the metal oxide phosphor has particles in a spherical shape.

17. The method of claim 1, wherein the metallic oxide phosphor is selected from the group consisting of (Gd,Y,Sc,Lu,La)$BO_3$:Eu$^{3+}$, (Gd,Y,Sc,Lu,La)$_2O_3$:Eu$^{3+}$, (Gd,Y,Sc,Lu,La)(P,V)$O_4$:Eu$^{3+}$, (Ca,Sr,Ba)$_2P_2O_7$:Eu$^{2+}$,Mn$^{2+}$, (Ca,Sr,Ba)$_5$(PO$_4$)$_3$(Cl,F,Br,OH):Eu$^{2+}$, Mn$^{2+}$, ZnSiO$_3$:Mn$^{2+}$, (Ca,Sr,Ba)MgAl$_{10}O_{17}$:Eu$^{2+}$,Mn$^{2+}$, (Ca,Sr,Ba)Al$_2O_4$:Eu$^{2+}$, (Ca,Sr,Ba)BPO$_5$:Eu$^{2+}$,Mn$^{2+}$, Y$_3$Al$_5O_{12}$:Ce$^{3+}$, (Ca,Sr,Ba)$_2$SiO$_4$:Eu$^{2+}$, and (Ca,Sr,Ba)$_3$SiO$_5$:Eu$^{2+}$.

* * * * *